July 13, 1954

J. E. CORSSEN 2,683,782

VACUUM OPERATED SWITCH

Filed Aug. 1, 1952

INVENTOR.
James E. Corssen
BY
McMorrow, Berman & Davidson
Attorneys.

Patented July 13, 1954

2,683,782

UNITED STATES PATENT OFFICE 2,683,782

VACUUM OPERATED SWITCH

James E. Corssen, St. Louis, Mo.

Application August 1, 1952, Serial No. 302,223

1 Claim. (Cl. 200—81.4)

This invention relates to a device mountable upon the intake manifold of an automotive vehicle engine, for the purpose of providing the vehicle operator with a visual indication as to the extent of vacuum within said manifold.

It is well known in the art that on excessive acceleration of an automotive vehicle, there is a substantial loss of vacuum in the intake manifold, resulting in a wastage of fuel.

It is, accordingly, the main object of the present invention to provide a vacuum operated switch mountable upon the intake manifold of an automotive vehicle engine, in circuit with a signal means capable of being observed by a vehicle operator, said switch being so designed as to cause the operator to be provided with an indication as to whether there is a loss of vacuum in the manifold.

One important object of the present invention is to provide an improved switch of the type stated, which will be so formed as to signal immediately to the vehicle operator the vacuum condition existing in the intake manifold, thus to permit the operator to act accordingly and thereby reduce loss of fuel.

Another object of importance is to provide a vacuum operated switch of the type stated which will be so designed as to be provided with a movable switch contact carried by a diaphragm, said diaphragm shifting in opposite directions responsive to changing vacuum conditions persisting in the manifold, the movable switch contact engaging one stationary contact when shifted in one direction, and engaging another stationary contact when shifted in an opposite direction, the stationary contacts being in circuit with different signal devices.

Another object is to provide a device of the character referred to which will be in the nature of an attachment to an automotive vehicle engine, the device being so formed, in this regard, as to be readily connected in communication with the intake manifold of the vehicle engine without requiring modification or redesign of said engine.

Still another object of importance is to provide a device as described which can be mounted in communication with the hose leading from the intake manifold through the conventional windshield wiper assembly, thus to eliminate the necessity of attaching additional hoses to the intake manifold.

Still another object of importance is to provide a device as stated which, when tapped into the hose leading to the windshield wiper assembly will not interfere in any way with the efficient operation of the windshield wiper.

Still another object is to provide a device of the type stated which can be constructed at a minimum of cost, but which will nevertheless be adapted to operate efficiently for an indefinite period of time, the device being so formed as to be provided with a minimum of parts simply arranged in a manner whereby they will not readily get out of order.

Other objects will appear from the following description, the claim appended thereto, and from the annexed drawing, in which like reference characters designate like parts throughout the several views, and wherein:

Figure 1:
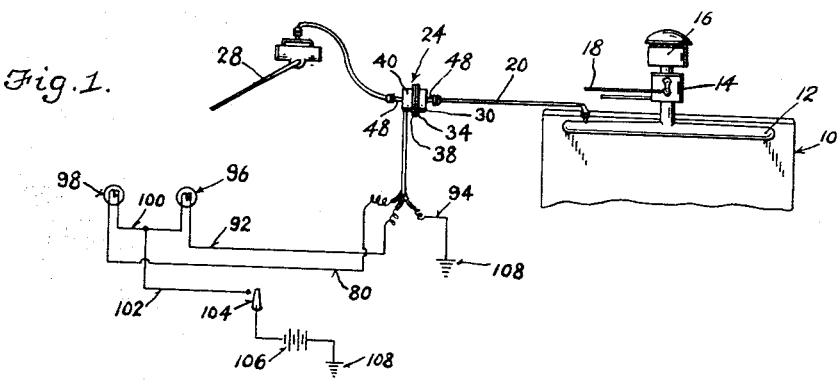
Figure 1 is a diagrammatic view illustrating a signal device when connected in communication with the intake manifold of an automotive vehicle engine in accordance with the present invention.

Referring to the drawings in detail, the illustrated device is adapted for attachment to a conventional automotive vehicle engine designated generally by the reference numeral 10, said engine having an intake manifold 12, a carburetor 14, an air cleaner 16, an accelerator control rod 18, and a hose 20 leading to the windshield wiper assembly. The device comprises a switch 24 which is adapted to be operatively connected to the hose leading to the windshield wiper, said hose being in two separate sections including a setcion 26 leading to the windshield wiper 28.

All parts so far described are conventional, with the exception of the switch 24, which will now be described in detail.

Figure 2:
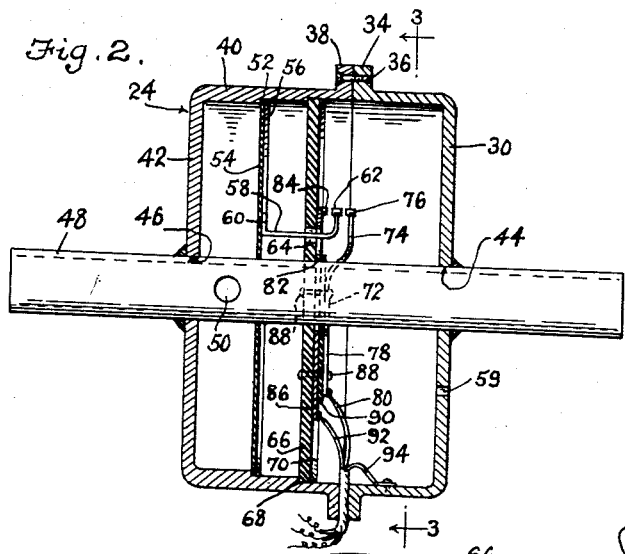
Figure 2 is a longitudinal sectional view through the vacuum operated switch comprising a component part of the present invention.
Figure 4:
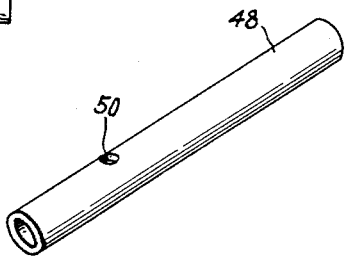
Figure 4 is a perspective view of a tubular member embodied in the device.
Figure 3:
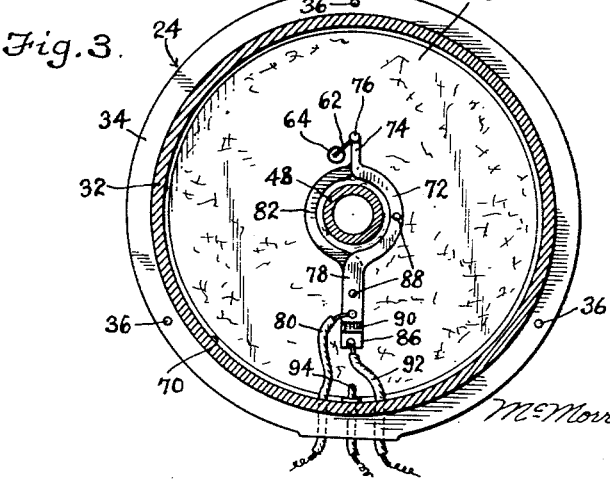
Figure 3 is an enlarged transverse sectional view on line 3—3 of Figure 3.

The switch 24 is illustrated in Figures 2 and 3, and includes a first cup-like section having a flat end plate 30 of circular formation, said end plate being integral, at its periphery, with an annular side wall 32. The plate 30 and side wall 32 define a cup-like casing section, and on the free edge of the side wall 32, there is formed an outwardly directed, annular flange 34 having a plurality of equidistantly spaced openings arranged circumferentially thereof and adapted to receive screws 36 whereby there is connected to the flange 34, the flange 38 formed upon the side wall 40 integral with an end plate 42.

The parts 38, 40, 42 comprise a second cup-like casing section, disposed in opposed relation to the first casing section, said sections cooperating to form a cylindrical, hollow casing.

Formed in the end plate 30 of the first casing section is a center opening 44, said opening being aligned coaxially of the casing with a center opening 46 formed in the end plate 42 of the second casing section.

A tubular member 48 extends through the casing and through the openings 44 and 46, the opposite ends of said tubular member projecting beyond the respective end plates 30, 42. The tubular member is formed open at its opposite ends, and intermediate its ends, has an opening 50. At one end, the tubular member 48 is adapted to be connected to the outer end of the hose 20, as shown in Figure 1, the other end of said tubular member 48 being adapted for connection to the hose 26 leading to the windshield wiper 28. It will thus be seen that the device constituting the present invention can be readily connected in communication with the intake manifold 12 of the vehicle engine, merely by removal of the ordinary hose leading to the windshield wiper, and substitution of short hose lengths 20, 26. Of course, when the tubular member is connected in this manner to the hose lengths 20, 26, the windshield wiper 28 will still be operable with its usual efficiency, since the tubular member 48 provides direct communication between the intake manifold 12 and said windshield wiper.

Formed in the inner surface of the casing side wall 40 is an annular shoulder or abutment 52, and engaged peripherally with the side wall 40 and against said abutment is a diaphragm 54, which is held in place against the associated abutment by means of a sealing and retaining ring 56 or its equivalent. In this way, the diaphragm is caused to divide the casing into separate chambers, one of said chambers being sealed and being in communication with the opening 50, and the other chamber being vented to atmosphere in any suitable manner, as for example, through the provision of a vent opening 59.

Secured fixedly to the diaphragm 54 is the movable switch contact 58, said switch 58 having a straight intermediate portion disposed normally to the plane of the diaphragm, and being provided at one end with a lateral extension 60 fixedly secured to the diaphragm. The movable contact, at the other end of the straight portion thereof, has a laterally extended finger provided with a contact button or terminal 62.

The straight intermediate portion of the movable contact extends through an opening 64 formed in a support plate 66 of insulating material, the support plate 66 being peripherally engaged against a shoulder 68 formed in the casing side wall and being held in place, at its periphery, by a ring 70.

The support plate 66 is disposed in spaced relation to the diaphragm 54, within the vented chamber of the casing, the opening 64 being formed to a substantially greater diameter than the diameter of the movable contact extended therethrough, thus to insure that atmospheric pressure will be provided at that side of the diaphragm 54 facing into and forming a wall of the vented chamber of the casing.

The support plate is adapted to carry a pair of fixed or stationary contacts, said contacts being best shown in Figure 3. One of said contacts is provided with an arcuate medial portion 72, riveted or otherwise fixedly secured to the support plate 66 and extending about the tube 48, in spaced, concentric relation to said tube. At one end of the arcuate medial portion 72 of said stationary contact, there is formed a straight end portion or finger 74, said finger being offset outwardly a substantial distance from the support plate 66 and being provided at its free end with a contact terminal or button 76 engageable by the terminal 62 of the movable contact when the diaphragm 54 shifts to the right in Figure 2.

At its other end, the arcuate medial portion 72 of said stationary contact has a straight end portion 78, and connected to said straight end portion is one end of a lead 80 extending out of the casing.

A second stationary contact has an arcuate medial portion 82 disposed oppositely to the arcuate medial portion 72 of the first stationary contact. The portion 82 of the second contact is in spaced relation to and is concentric with the tubular member 48, and at one end, is provided with a terminal 84. As will be seen, the terminal 62 of the movable contact is disposed medially between the terminals 76, 84 of the respective stationary contacts, and when the diaphragm is in the position shown in Figure 2, this being the position assumed by the diaphragm when the vehicle is not in operation, the stationary contact terminals will be spaced equidistantly from the terminal 62 disposed therebetween.

At its other end, the arcuate portion 82 of the second stationary contact is integral with an end portion 86, rivets or equivalent fastening elements 88 extending through the end portions 78, 86 of the respective stationary contacts, and through an insulating member 90 interposed between said end portions.

A lead 92 extends from the end portion 86 of the second stationary contact, and a ground wire 94 is secured to the conductive wall of the cylindrical casing.

The electrical connections constituting a part of the device may now be readily noted, and reference should here be had to Figure 1. As will be seen, the lead 92 extends to a green signal lamp bulb 96, which would, in a commercial embodiment of the invention, be mounted upon the dash panel of the vehicle, at a location at which it can be observed by the vehicle operator without failure on his part to give full time and attention to driving. Adjacent the green lamp bulb 96, there is mounted on the instrument panel a red lamp bulb 98, to which lead 80 extends. A common lead 100 extends from the bulbs 96, 98 to a power lead 102, said power lead 102 having intermediate its ends the ignition switch 104 of the vehicle and being in circuit with the vehicle battery 106. The battery 106 has, of course, the ground lead extending to the ground 108 of the vehicle, to which the lead 94 also extends.

It will be readily observed that when the vehicle is not in operation and the ignition is shut off, no circuits will be closed to the bulbs 96, 98. However, when the vehicle is in operation, and assuming that a proper vacuum is being maintained in the intake manifold, the diaphragm 54 will be shifted to the left in Figure 2, due to the existence of a substantial vacuum within the sealed chamber of the casing. As a result, the contact terminals 62, 84 will be engaged, closing a circuit to the green bulb 96.

Should the vehicle operator accelerate the engine excessively, causing a loss of vacuum in the manifold 12, the diaphragm 54 will be shifted to the right in Figure 2, and a circuit will now be closed to the bulb 98. As a result, the vehicle operator is immediately made aware of the fact that the vacuum in the manifold has dropped excessively, and he will thus perceive immediately the necessity of accelerating more slowly.

In this way, the waste of fuel is reduced to a substantial degree, through the use of a device formed in accordance with the present invention capable of being manufactured at relatively low cost and installed without difficulty upon any conventional automotive vehicle engine.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

In a vacuum operated switch, a hollow casing having closed ends, a flexible diaphragm fixed across the interior of said casing near and spaced from one of said ends of the casing so as to define a first chamber and a second chamber, a fixed support plate extending across the interior of said second chamber and spaced from the other end of the casing, a pair of insulated electrical contacts mounted on said support plate on the side thereof remote from said diaphragm, one of said contacts being close to said remote side of the support plate and the other contact being spaced away from the remote side of the support plate, a contactor fixed to said diaphragm, said contactor comprising an arm projecting from said diaphragm in the direction of said support plate, said support plate having an opening through which said arm extends, for endwise movement relative to the support plate, sealing means sealing the opening around said arm, said arm terminating in a contact element normally positioned between said pair of contacts, said contact element being arranged to engage said contacts one at a time upon movement of the diaphragm to opposite sides of a normal position, a tube extending through the casing ends, the support plate, and the diaphragm, said tube having open ends located outside of the casing ends, said tube having an opening located in said first chamber and being otherwise imperforate.

References Cited in the file of this patent
UNITED STATES PATENTS

| Number | Name | Date |
|---|---|---|
| 1,774,801 | Mocke et al. | Sept. 2, 1930 |
| 1,850,626 | Hukill | Mar. 22, 1932 |
| 2,253,425 | Garland | Aug. 19, 1941 |
| 2,320,368 | Leathers | June 1, 1943 |
| 2,418,536 | Wood | Apr. 8, 1947 |
| 2,537,474 | Mejean | Jan. 9, 1951 |
| 2,567,519 | Livingston | Sept. 11, 1951 |
| 2,582,483 | Hallerberg | Jan. 15, 1952 |